United States Patent
Mondal et al.

(10) Patent No.: US 11,645,318 B2
(45) Date of Patent: May 9, 2023

(54) SYSTEMS AND METHODS FOR UNIFIED EXTRACTION OF ATTRIBUTES

(71) Applicant: Walmart Apollo, LLC, Bentonville, AR (US)

(72) Inventors: Sakib Abdul Mondal, Bangalore (IN); Tuhin Bhattacharya, Kolkata (IN)

(73) Assignee: Walmart Apollo, LLC, Bentonville, AR (US)

( * ) Notice: Subject to any disclaimer, the term of this patent is extended or adjusted under 35 U.S.C. 154(b) by 457 days.

(21) Appl. No.: 16/998,861

(22) Filed: Aug. 20, 2020

(65) Prior Publication Data

US 2022/0058717 A1   Feb. 24, 2022

(51) Int. Cl.

| | |
|---|---|
| *G06F 16/9535* | (2019.01) |
| *G06F 16/35* | (2019.01) |
| *G06F 16/33* | (2019.01) |
| *G06F 16/335* | (2019.01) |
| *G06F 16/332* | (2019.01) |
| *G06N 20/00* | (2019.01) |
| *G06F 18/214* | (2023.01) |

(52) U.S. Cl.
CPC ............ *G06F 16/35* (2019.01); *G06F 16/335* (2019.01); *G06F 16/3329* (2019.01); *G06F 16/3334* (2019.01); *G06F 18/214* (2023.01); *G06N 20/00* (2019.01)

(58) Field of Classification Search
CPC .... G06F 40/284; G06F 40/30; G06F 16/3344; G06N 20/00; G06N 3/02; G06N 3/08; G06N 3/044
See application file for complete search history.

(56) References Cited

U.S. PATENT DOCUMENTS

| | | | |
|---|---|---|---|
| 9,892,133 B1* | 2/2018 | Biessmann | G06N 20/10 |
| 10,235,449 B1 | 3/2019 | Viswanathan et al. | |
| 10,380,236 B1* | 8/2019 | Ganu | G06F 40/284 |
| 2010/0223214 A1* | 9/2010 | Kirpal | G06F 16/86 |
| | | | 706/12 |
| 2016/0321358 A1* | 11/2016 | Kanani | G06F 16/88 |
| 2017/0212921 A1* | 7/2017 | Wu | G06Q 10/00 |
| 2019/0066185 A1 | 2/2019 | More et al. | |

(Continued)

OTHER PUBLICATIONS

Bing et al, "Unsupervised extraction of popular product attributes from e-commerce web sites by considering customer reviews", 2016, ACM Transactions on Internet Technology (TOIT). Apr. 15, 2016;16(2):1-7.*

(Continued)

*Primary Examiner* — Olujimi A Adesanya
(74) *Attorney, Agent, or Firm* — Morgan, Lewis & Bockius LLP; Manita Rawat

(57) ABSTRACT

Systems and methods for unified attribute extraction are disclosed. A set of product data including at least one text-based description of each of the products in the set of products is received and at least one closed list attribute is extracted from the at least one text-based description of each of the products. The at least one closed list attribute is extracted by an attribute extraction model configured to implement an extended conditional random field (XCRF) process. A set of attributes including each of the at least one closed list attributes extracted from the at least one text-based description of each of the products in the set of products is output.

20 Claims, 11 Drawing Sheets

(56) References Cited

U.S. PATENT DOCUMENTS

2019/0278865 A1    9/2019  Hurwitz et al.
2019/0311210 A1*  10/2019  Chatterjee .............. G06N 3/044
2021/0034634 A1*  2/2021  Iyer .................... G06F 16/9535
2021/0034683 A1*  2/2021  Iyer .................... G06Q 30/0603

OTHER PUBLICATIONS

Zhu et al, "Simultaneous record detection and attribute labeling in web data extraction", 2006, InProceedings of the 12th ACM SIGKDD international conference on Knowledge discovery and data mining Aug. 20, 2006 (pp. 494-503).*

Wang et al, "A survey on opinion mining: From stance to product aspect.", Mar. 2019, IEEE Access. Mar. 21, 2019;7:41101-24.*

Luo et al, "Features induction for product named entity recognition with CRFs", 2012, InProceedings of the 2012 IEEE 16th International Conference on Computer Supported Cooperative Work in Design (CSCWD) May 23, 2012 (pp. 491-496). IEEE.*

Zheng et al., "OpenTag: Open Attribute Value Extraction from Product Profiles", 2018, p. 1-10.

Sawant et al., "Product Discovery From E-Commerce Listings via Deep Text Parsing", 2018, p. 1-10.

* cited by examiner

SYSTEMS AND METHODS FOR UNIFIED EXTRACTION OF ATTRIBUTES

TECHNICAL FIELD

This application relates generally to attribute extraction and, more particularly, to extraction of open and closed list attributes.

BACKGROUND

Attribute extraction is the process of extracting meaningful attributes from information associated with one or more items. For example, in an e-commerce system, attribute extraction may be used to extract meaningful attributes from free text descriptions of one or more products. Attributes of one or more items may include values having a closed set (i.e., all the possible set of values for the attribute are known) (referred to herein as "closed list attributes") or values having an open set (i.e., values for the attribute may be added or removed) (referred to herein as "open list attributes").

In current systems, attribute extractions of closed and open list attributes are treated as separate classification and sequence labelling problems. In order to extract all meaningful attributes, separate attribute extraction systems must be configured and implemented. None of the current systems or approaches provides a solution to extract all attributes, irrespective of the attribute type.

SUMMARY

In various embodiments, a system including a memory having instructions stored thereon and a processor is disclosed. The processor is configured to read the instructions to receive a set of product data including at least one text-based description of each of the products in the set of products and extract at least one closed list attribute from the at least one text-based description of each of the products. The at least one closed list attribute is extracted by an attribute extraction model configured to implement an extended conditional random field (XCRF) process. The processor further outputs a set of attributes including each of the at least one closed list attributes extracted from the at least one text-based description of each of the products in the set of products.

In various embodiments, a non-transitory computer-readable medium having instructions stored thereon is disclosed. The instructions, when executed by a processor cause a device to perform operations including receiving a set of product data including at least one text-based description of each of the products in the set of products and extracting at least one closed list attribute from the at least one text-based description of each of the products. The at least one closed list attribute is extracted by an attribute extraction model configured to implement an extended conditional random field (XCRF) process. The device further outputs a set of attributes including each of the at least one closed list attributes extracted from the at least one text-based description of each of the products in the set of products In various embodiments, a method of extracting one or more attributes is disclosed. The method includes steps of receiving a set of product data including at least one text-based description of each of the products in the set of products and extracting at least one closed list attribute from the at least one text-based description of each of the products. The at least one closed list attribute is extracted by an attribute extraction model configured to implement an extended conditional random field (XCRF) process. A set of attributes including each of the at least one closed list attributes extracted from the at least one text-based description of each of the products in the set of products is output.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of this invention.

Figure 1:
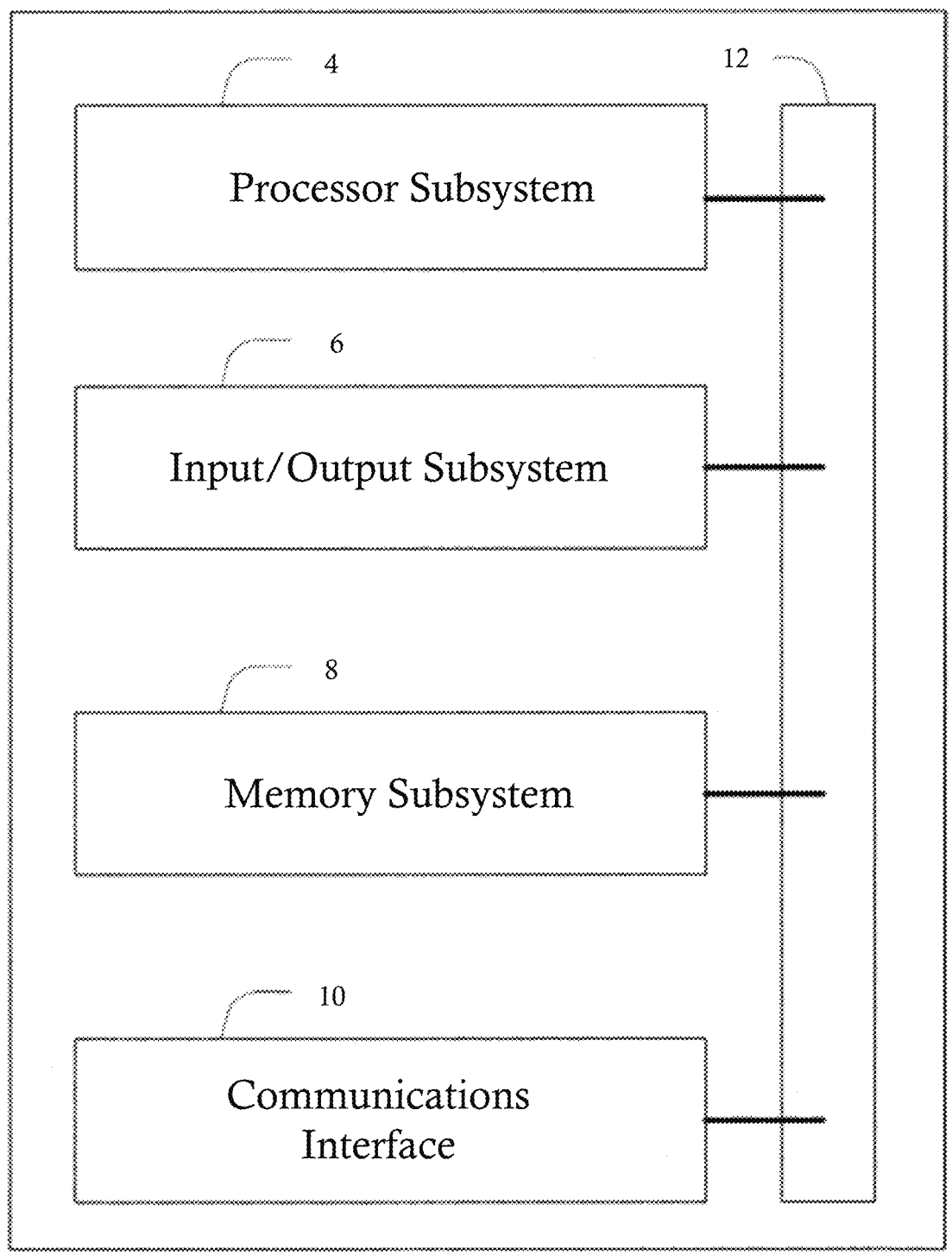
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
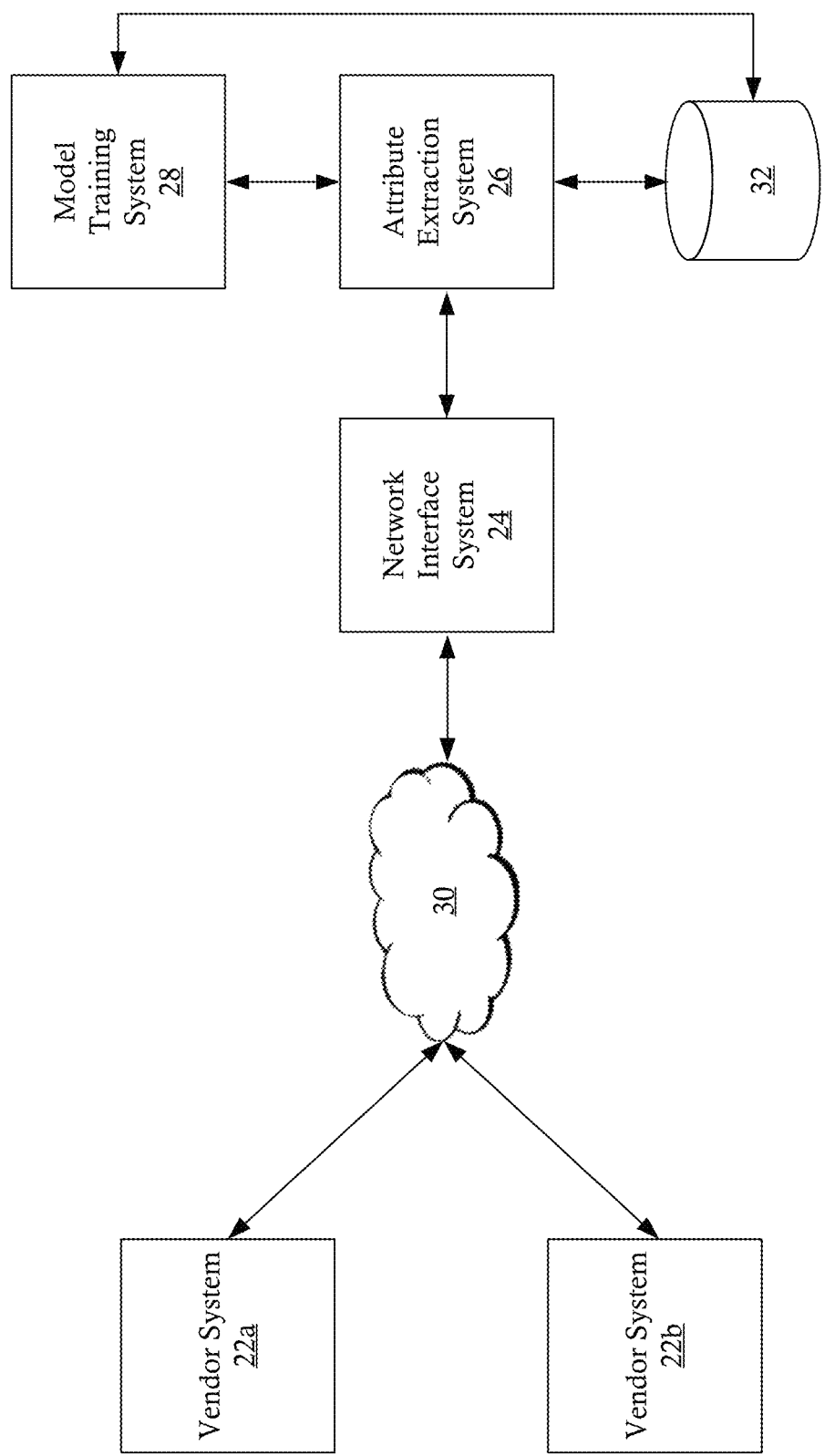
FIG. 2 illustrates an e-commerce platform configured to provide evaluation of third-party participants, in accordance with some embodiments.

FIG. 2 illustrates a networked environment 20 configured to provide a unified attribute extraction platform, in accordance with some embodiments. The networked environment 20 may include, but is not limited to, one or more vendor systems 22a-22b, at least one network interface system 24, at least one attribute extraction system 26, and at least one model training system 28. Each of the vendor systems 22a-22b, network interface system 24, attribute extraction system 26, and/or the model training system 28 may include a system as described above with respect to FIG. 1. Although embodiments are illustrated having a discrete systems, it will be appreciated that one or more of the illustrated systems may be combined into a single system configured to implement the functionality and/or services of each of the combined systems. For example, although embodiments are illustrated and discussed herein including each of a network interface system 24, an attribute extraction system 26, and a model training system 28, it will be appreciated that these systems may be combined into a single logical and/or physical system configured to perform the functions and/or provide services associated with each of the individual systems.

In some embodiments, a network environment or platform may be provided to the one or more vendor systems 22a-22b by the network interface system 24. The network platform may include a network interface, such as, for example, an interface accessible through one or more browsers, applications, or other interfaces. For example, in some embodiments, the network platform is an e-commerce platform. Each of the vendor systems 22a-22b may be associated with one or more third-parties users of the network platform. For example, in embodiments including an e-commerce platform, each of the vendor systems 22a-22b may be associated with a third-party vendor that offers goods and/or services for sale through the e-commerce platform, a third-party vendor that completes orders on behalf of one or more other participants, a third-party vendor that offers services through the networked environment, such as technical support, purchase support, business support, and/or any other suitable third-party vendor.

In some embodiments, each vendor system 22a-22b is configured to provide a data set related to one or more products (e.g., goods, services) offered for sale on the e-commerce platform. The data sets may be provided to the network interface system 24 (and/or any other system) via a network 30 configured to provide data communication between the vendor systems 22a-22b and the network interface system 24. For example, in some embodiments, each of the client systems 22*a*-22*b* is associated with a retailer and/or manufacturer that sells/manufactures at least one physical good (e.g., clothing, electronics, toys, home goods, groceries, etc.). Each data set includes text-based descriptions of the one or more products. For example, in some embodiments, each product may include at least a text-based title and/or a text-based description. Although embodiments are discussed herein including a title and description, it will be appreciated that the disclosed systems and methods may be applied to any text-based (e.g., free-text based) descriptors associated with one or more items. Further, although embodiments are discussed herein including free-text based descriptors, it will be appreciated that the disclosed systems and methods may be applied to non-text based descriptors.

In some embodiments, an attribute extraction system 26 is configured to extract one or more attributes from the text-based descriptions in a data set provided by a vendor system 22*a*-22*b*. The attribute extraction system 26 is configured to extract both closed list attributes and open list attributes using a single, unified extraction process implemented by one or more trained artificial intelligence networks (e.g., trained machine-learning networks). The trained network(s) are configured to receive a text description of a product as an input and generate one or more outputs associated with each of the desired attributes. As discussed in greater detail below, in some embodiments, the trained network(s) are configured to implement a conditional random field (CRF) and/or extended condition random field (XCRF) classification process.

In some embodiments, the one or more trained models are generated by a model training system 28. The model training system 28 is configured to receive one or more training data sets and generate one or more unified attribute extraction models, as discussed in greater detail below. The unified attribute extraction models may be trained using any suitable machine-learning training methods, processes, and/or algorithms. In some embodiments, and as discussed in greater detail below, the unified attribute extraction models include a set of embedding layers are used for both closed and open list attribute extraction. The unified attribute extraction models may apply any suitable process for attribute extraction, such as conditional random field methods for sequential labelling tasks (e.g., open list attribute extraction) and/or extended conditional random field methods for classification tasks (e.g., closed list attribute extraction), as discussed in greater detail below.

The model training system 28 may be configured to generate and store one or more trained models in a model database 32. In some embodiments, the attribute extraction system 26 is configured to load one or more trained models from the model database 32, for example, each time a data set is received from a vendor system 22*a*-22*b*, at a predetermined interval, when a new model is available, and/or according to any other predetermined criteria. In some embodiments, the attribute extraction system 26 is configured to provide received product data sets and associated attributes, either as identified by the vendor system 22*a*-22*b* and/or by a trained model, to the model database 32 and/or the model training system 28. The model training system 28 may be configured to use the received product data sets and associated attributes to further refine (i.e., train) attribute selection models.

Although embodiments are discussed herein including an e-commerce platform, it will be appreciated that the systems and methods disclosed herein are applicable to any system and/or environment that allows third-party participants to act in traditional "first-party" roles. Example environments include, but are not limited to, e-commerce platforms, service environments (e.g., technical assistance, medical assistance, etc.), software-as-a-service environments, server environments, digital environments, and/or any other suitable environment or system.

Figure 3:
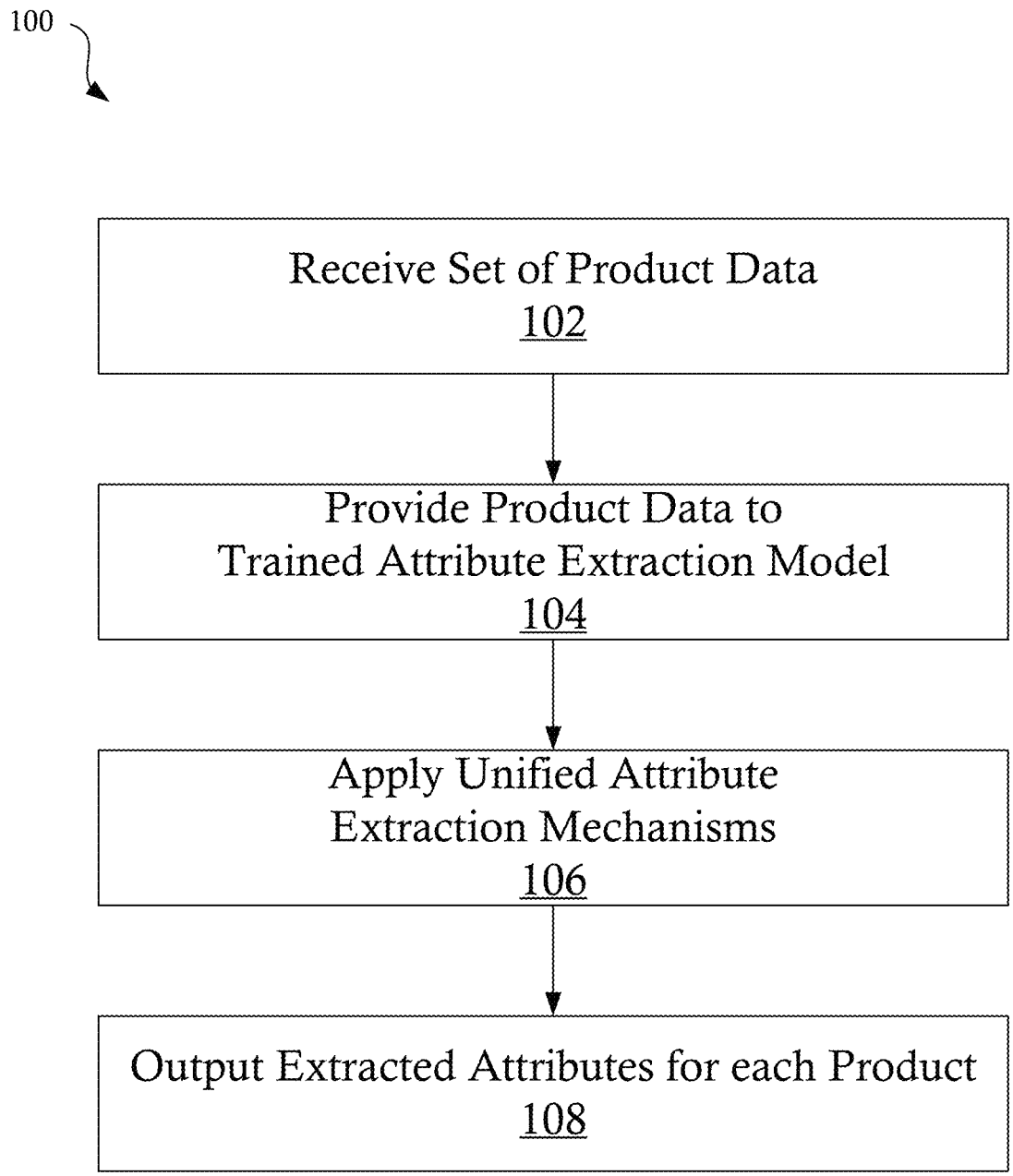
FIG. 3 is a flowchart illustrating a process of extracting one or more attributes using a trained attribute extraction model configured to provide unified attribute extraction, in accordance with some embodiments.
Figure 4:
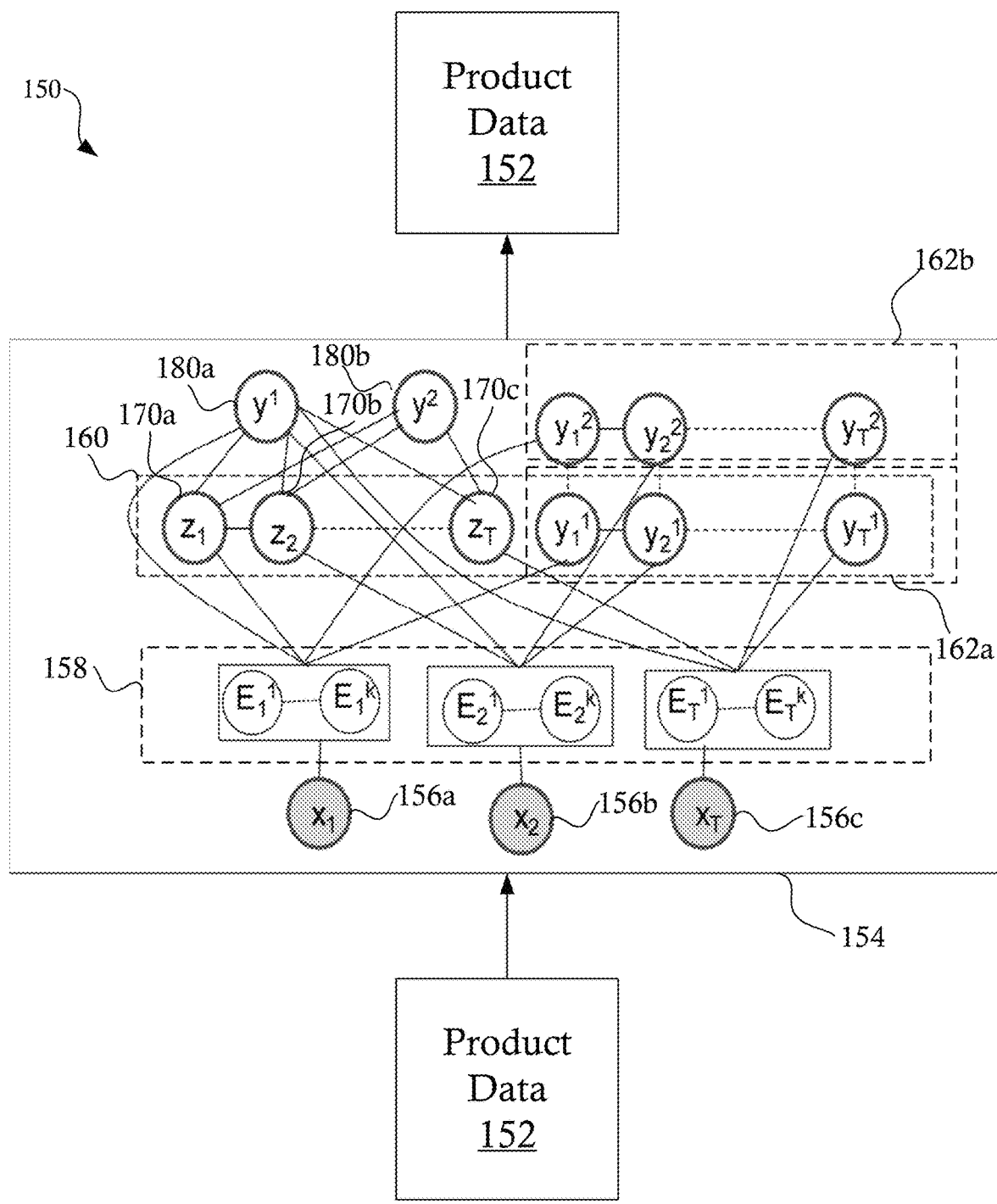
FIG. 4 is a flow diagram illustrating various steps of the process of FIG. 3, in accordance with some embodiments.

FIG. 3 is a flowchart illustrating a process 100 of extracting one or more attributes using a trained attribute extraction model configured to provide unified attribute extraction, in accordance with some embodiments. FIG. 4 is a flow diagram 150 illustrating various steps of the process 100 in accordance with some embodiments. At step 102, a set of product data 152 including a text-based title and text-based description for each product in the set of product data 152 is received by a system, such as, for example, the attribute extraction system 26 discussed above. The set of product data 152 may include products having open list attributes and/or closed list attributes.

At step 104, the set of product data 152 is provided to a trained attribute extraction model 154 and, at step 106, at least one predetermined open list attribute and/or at least one predetermined closed list attribute is extracted using a unified attribute extraction mechanism. In some embodiments, the trained attribute extraction model 154 is configured to use at least one embedding layer 158 and at least one hidden layer 160 having a shared set of class values for both open list attribute and closed list attribute extraction. The trained attribute extraction model 154 receives a plurality of input tokens 156*a*-156*c* corresponding to the title and description of each item in the set of product data 152. The shared at least one embedding layer 158 is configured to extract a set of embeddings for each input token. The embedding layer(s) 158 may be configured to apply any suitable text-based embedding process, such as, for example, generating a word embedding for each word in the corresponding input token 156*a*-156*c*.

Figure 5:
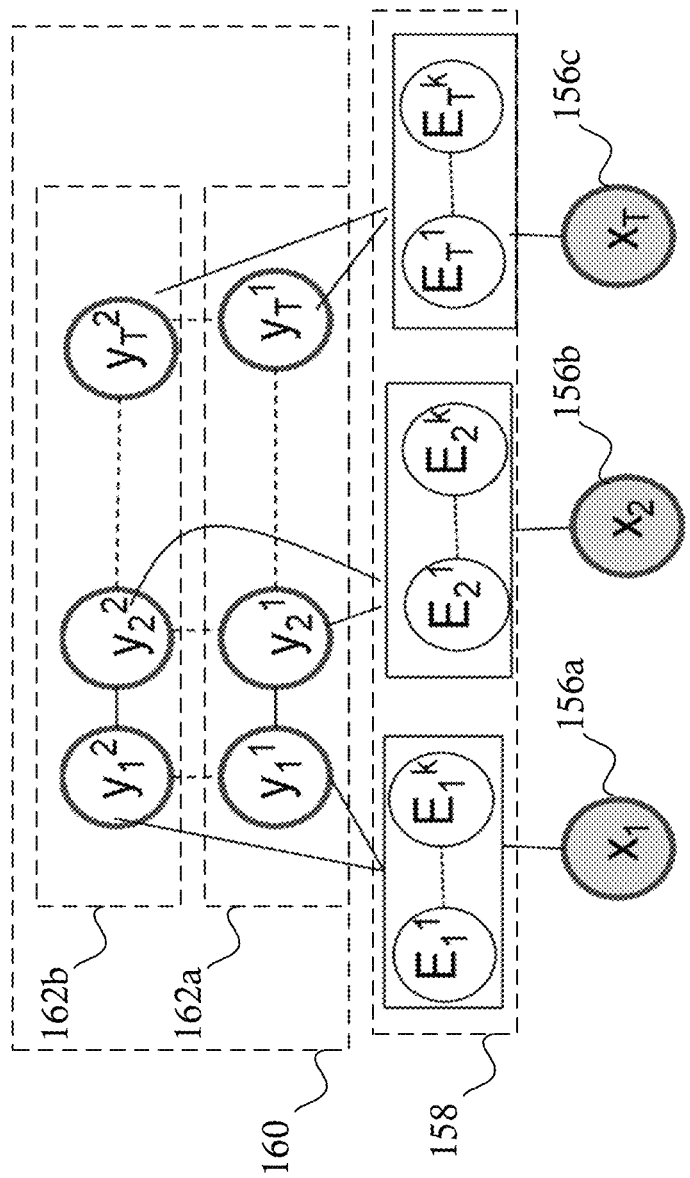
FIG. 5 illustrates a trained attribute extraction model including a plurality of linear chain CRF sequence labels, in accordance with some embodiments.

Each embedding generated for each corresponding input token 156*a*-156*c* is provided to a set of hidden layers 160 including a set of shared hidden variables (Z). The set of hidden layers is configured to implement a CRF process to extract one or more open list attributes and an extended CRF process to extract one or more closed list attributes. For example, in some embodiments, each of the generated embeddings for each corresponding input token 156*a*-156*c* are provided to one or more hidden layers 160 including a plurality of linear chain CRF sequence labels 162*a*, 162*b*, as illustrated in FIG. 5. The open list attributes may be extracted according to the equation:

$$p(y^1, y^2 \mid x, \lambda) = \frac{1}{Z_{y^1}} \prod_{t=1}^{T} \Phi_t(x, y_t^1, y_{t+1}^1, \lambda^1) \frac{1}{Z_{y^2}} \prod_{t=1}^{T} \Phi_t(x, y_t^2, y_{t+1}^2, \lambda^2)$$

$$= \frac{1}{Z_{y^1}} \frac{1}{Z_{y^2}} \prod_{t=1}^{T} \exp^{\Sigma_{k=1}^{K} \lambda_k^1 f_k(x_t, y_t^1, y_{t+1}^1, \lambda^1) + \Sigma_{k=1}^{K} \lambda_k^1 f_k(x_t, y_t^2, y_{t+1}^2, \lambda^2)}$$

where $y^1$ and $y^2$ are class labels for the open classes, Z are latent variables in a hidden layer, and $\lambda$ is a weighting of a given parameter.

Figure 6:
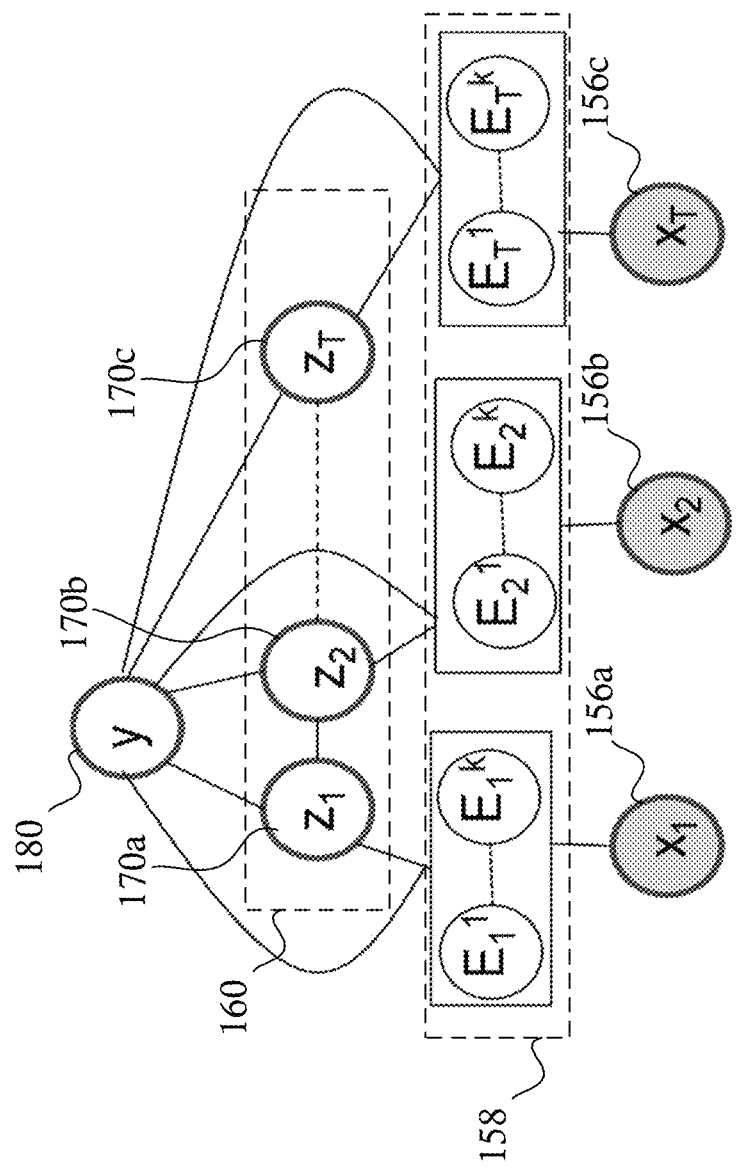
FIG. 6 illustrates extraction of a closed list attribute based on a transformation through a set of latent variables in a hidden layer, in accordance with some embodiments.

In some embodiments, extraction of closed list attributes includes generating an output class that is modelled as a function of an input, for example, a transformation through a set of latent variables, e.g., Z variables 170*a*-170*c* in the hidden layer 160 as illustrated in FIG. 6. The attribute classification may be generated according to the equation:

$$p(y\,|\,x,\lambda) = \sum_z \frac{1}{Z} \prod_{t=1}^{T} \Phi_t(x_t, y, z_t, z_{t+1}, \lambda)$$

Figure 7:
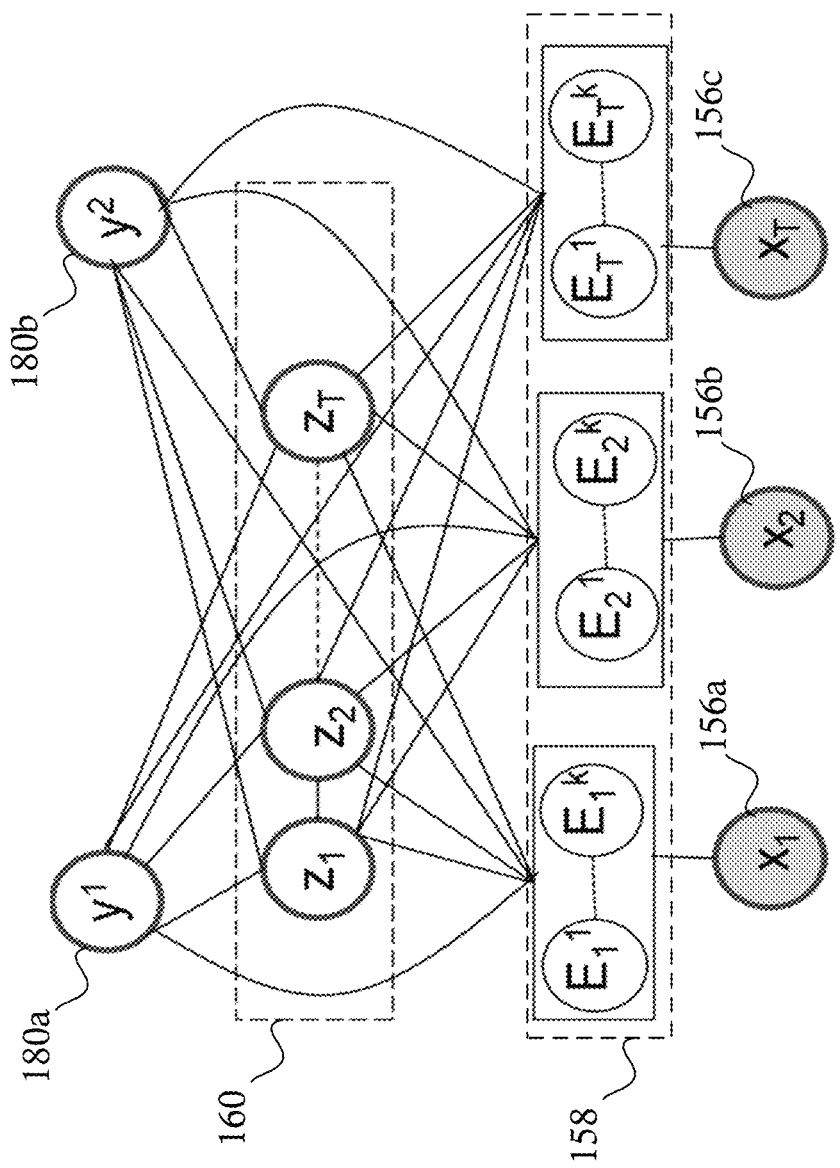
FIG. 7 illustrates extraction of multiple closed list attributes based on transformation through a shared set of latent variables in a hidden layer, in accordance with some embodiments.

In some embodiments, multiple classifications are handled by expressing each output as a different linear combination of Z variables 170a-170c in the hidden layer 160, as illustrated in FIG. 7. The multiple classifications may be generated according to the equation:

$$p(y^1, y^2\,|\,x,\lambda_1,\lambda_2) = \left( \sum_z \frac{1}{Z_1} \prod_{t=1}^{T} \Phi_t(x_t, y^1, z_t, z_{t+1}, \lambda_1) \right) \left( \sum_z \frac{1}{Z_2} \prod_{t=1}^{T} \Phi_t(x_t, y^2, z_t, z_{t+1}, \lambda_2) \right)$$

At step 108, the trained attribute extraction model 154 outputs a selected attribute 180a-180d for each set of closed list attributes and/or open list attributes. For example, in some embodiments, a first class label 180a for a first closed list attribute list, a second class label 180b for a second closed list attribute list, a first sequence label 180c for a first open list, and/or a second sequence label 180d for a second open list may be generated by the attribute extraction model 154. Although specific embodiments are discussed herein, it will understood that the trained attribute extraction model 154 can be configured to generate any number of class labels (e.g., identify an attribute from any number of open lists) and/or any number of sequence labels (e.g., identify an attribute from any number of closed lists). For example, the trained attribute extraction model 154 may be configured to identify no class labels (e.g., no open list attributes), one class label (e.g., one open list attribute), or two or more class labels (e.g., two or more open list attributes). Similarly, the trained attribute extraction model 154 may be configured to identify no sequence labels (e.g., no closed list attributes), one sequence label (e.g., one closed list attribute), or two or more sequence labels (e.g., two or more closed list attributes).

The generated attributes may be used, for example, to populate an e-commerce catalog or database. For example, in some embodiments, the extracted attributes allow classification, listing, indexing, and/or other integration of each product in the set of products 152 into an e-commerce platform. The extracted attributes represent a minimum set of attributes necessary to add a product to an e-commerce catalog, a set of all potential attributes of products in an e-commerce platform, and/or any other subset of potential attributes. Although embodiments are discussed herein including an e-commerce platform, it will be appreciated that the trained attribute extraction model 154 may be configured to extract attributes for any suitable network platform.

Figure 8:
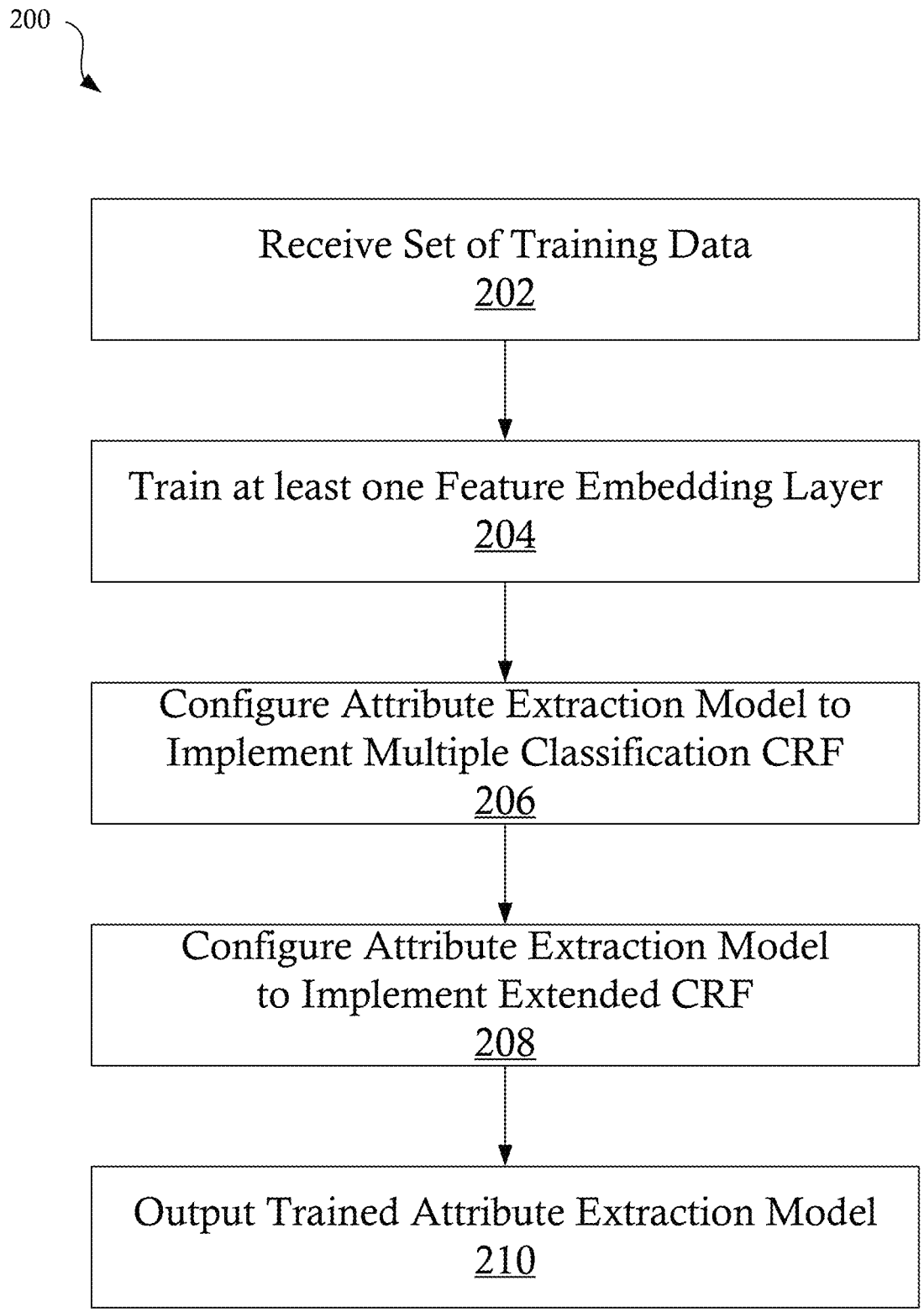
FIG. 8 is a flowchart illustrating a method of training an attribute extraction model, in accordance with some embodiments.
Figure 9:
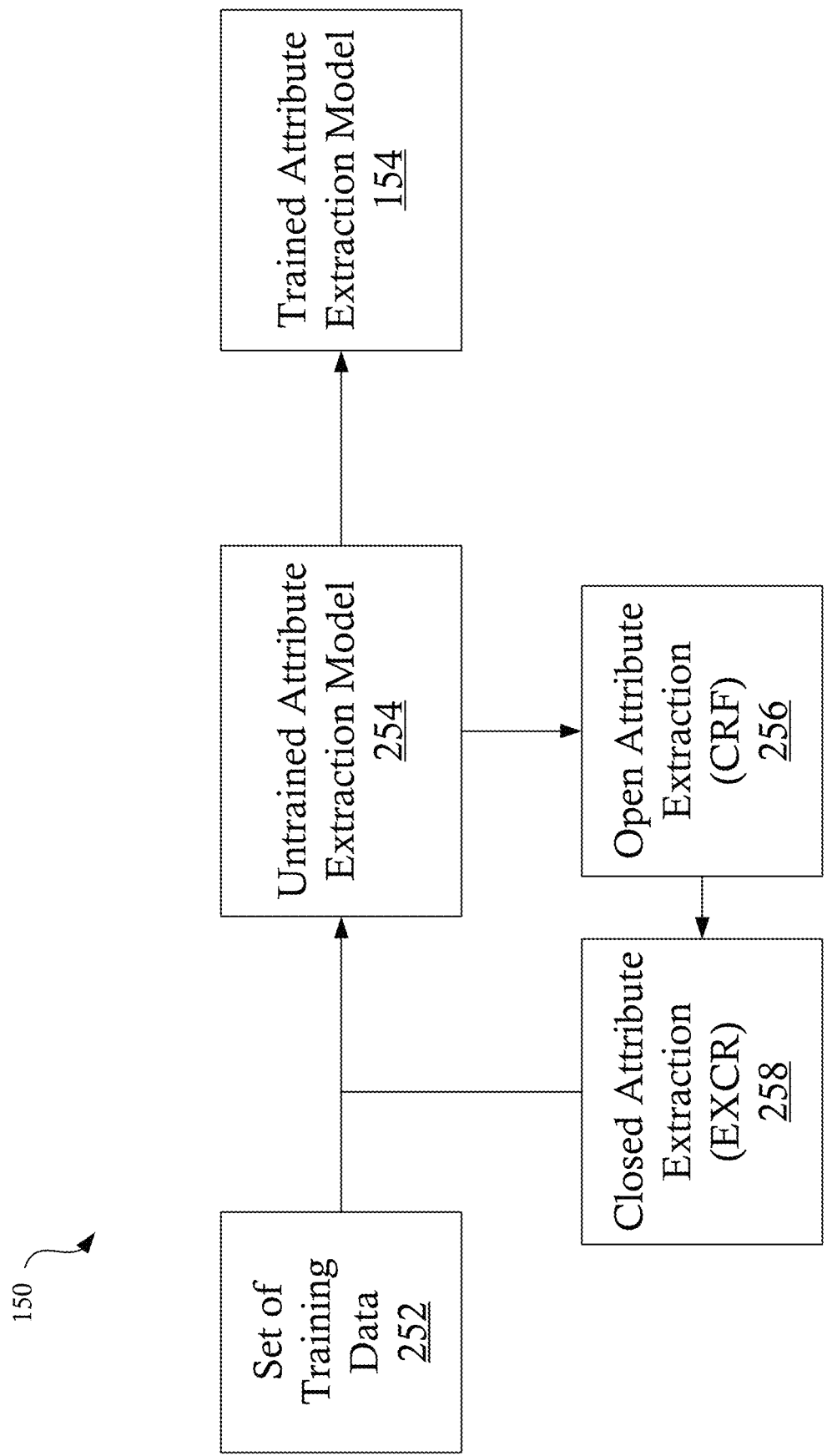
FIG. 9 is a process flow illustrating various steps of the method of FIG. 8, in accordance with some embodiments.

FIG. 8 is a flowchart illustrating a method 200 of training an attribute extraction model 154, in accordance with some embodiments. FIG. 9 is a process flow 250 illustrating various steps of the method 200, in accordance with some embodiments. At step 202, a set of training data 252 is received by a system configured to generate an attribute extraction model, such as, for example, the training system 28. The set of training data 252 includes a set of products each having a text-based title and description associated therewith and specification of at least one attribute for each product. The specified set of attributes may include only attribute names and types and/or may include attribute values for each product. The specified set of attributes may include at least one closed list attribute and at least one open list attribute associated with the product. The set of training data is provided to an untrained model 254.

At step 204, at least one feature embedding layer is trained to extract one or more embeddings from the text-based title and description associated with each product in the set of products. The at least one feature embedding layer may be configured as any suitable embedding layer, such as, for example, a word embedding layer, a character embedding layer, and/or any other suitable embedding layer or combination of embedding layers. The at least one embedding layer 256 is configured, through one or more iterative processes, to generate a set of embeddings representative of the words or phrases contained in the text-based titles and/or descriptions associated with each product.

At step 206, the untrained model 254 is configured (i.e., trained) to implement a multiple classification CRF process 256 based on the feature embeddings generated by the at least one embedding layer. The multiple classification CRF process is configured to generate a sequence label for each set of open list attributes contained in the training data set 252. For example, if products in the set of training data 252 include a first attribute selected from a first set of open list attributes and a second attribute selected from a second set of open list attributes, the untrained model 254 is configured to implement a multiple classification CRF that identifies a first attribute associated with the first set of open list attributes and a second attribute associated with the second set of open list attributes. Although embodiments are discussed herein including two open list attributes, it will be appreciated that an attribute extraction model may be configured to identify any number of open list attributes from the text-based title and/or descriptions associated with products in the training data set 252. For example, in various embodiments, an attribute extraction model may be configured to identify, zero, one, two, or more open list attributes from corresponding sets of attributes for each product based on the attributes included in the training data set 252.

At step 208, the untrained model 254 is configured (i.e., trained) to implement an extended CRF process 258 based on the feature embeddings generated by the at least one embedding layer. The extended CRF process uses a set of hidden variables ("Z") that are shared with each set of closed list attributes and/or with each set of open list attributes. The hidden variables capture one or more states associated with each set of attributes and identify inter-dependencies of attributes.

The extended CRF process is configured to generate a class label for each set of closed list attributes contained in the training data set 252. For example, if products in the set of training data 252 include a first attribute selected from a first set of closed list attributes and a second attribute selected from a second set of closed list attributes, the untrained model 254 is configured to implement an extended CRF process that identifies a first attribute associated with the first set of closed list attributes and a second attribute associated with the second set of closed list attributes. Although embodiments are discussed herein including two closed list attributes, it will be appreciated that an attribute extraction model may be configured to identify any number of closed list attributes from the text-based title and/or descriptions associated with products in the training data set 252. For example, in various embodiments, an attribute extraction model may be configured to identify, zero, one, two, or more closed list attributes from corresponding sets of attributes for each product based on the attributes included in the training data set 252.

Figure 10:
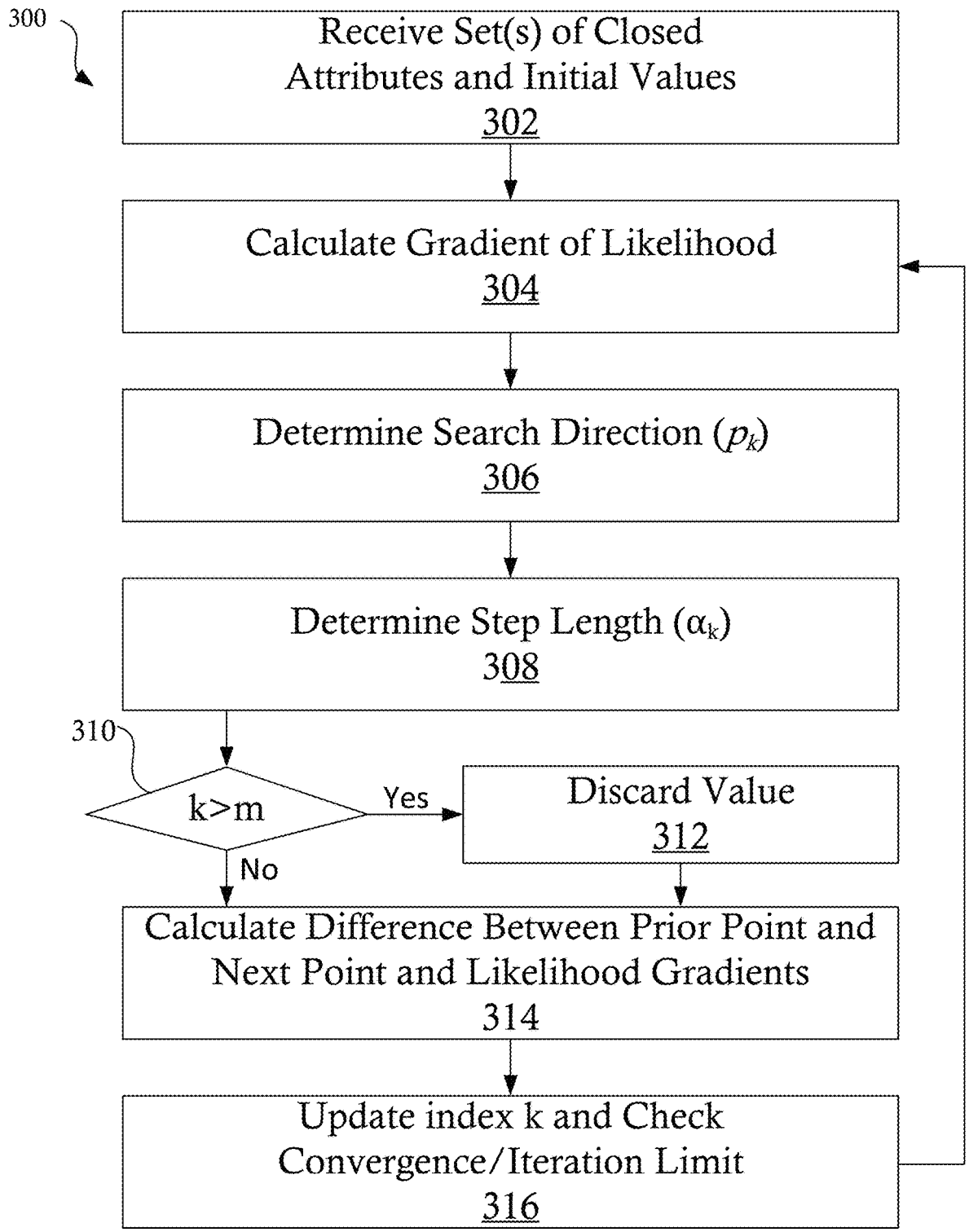
FIG. 10 is a flowchart illustrating a process of training an extended CRF process using a limited memory Broyden-Fletcher-Goldfarb-Shanno (L-BFGS) algorithm, in accordance with some embodiments.

In some embodiments, training an extended CRF process includes estimating parameter weightings (i.e., λ) using a limited memory Broyden-Fletcher-Goldfarb-Shanno (BFGS) algorithm (L-BFGS), as illustrated in FIG. 10. At step 302, the L-BFGS is provided with each set of closed list attributes contained within the set of training data 252 and an initial guess value ($x_0$) for implementation of the extended CRF process. The L-BFGS is configured to perform a predetermined number of iterations m, where m is an integer. The L-BFGS utilizes a gradient of likelihood (ΔL), which is calculated based on a likelihood maximization. In some embodiments, the likelihood of each class is maximized according to the equation:

$$L = \log p(y \mid x, \lambda) = \log\left(\sum_z \frac{1}{Z_x}\right) + \sum_{t=1}^{T} \log \Phi_t(x_t, y, z_t, z_{t+1}, \lambda) \text{ where } \Phi(x_t, y, z_t, z_{t+1}, \lambda) = \exp^{\sum_{k=1}^{K} \lambda_k f_k(x_t, z_t, z_{t+1})}.$$ At step 304, the gradient (ΔL) can be calculated as :

$$\frac{\delta L}{\delta \lambda_k} = \sum_{n=1}^{N} \left\{ \sum_{t=1}^{T-1} \sum_{z_t=1}^{M} \sum_{z_{t+1}=1}^{M} p(z_t, z_{t+1} \mid x_{n,t}, y_n, \lambda) f_{i,k}(x_{n,t}, y_n, z_t, z_{t+1}) - \sum_{t=1}^{T-1} \sum_{z_t=1}^{M} \sum_{z_{t+1}=1}^{M} \sum_{y=1}^{|Y|} p(y, z_t, z_{t+1} \mid x_{n,t}, \lambda) f_{i,k}(x_{n,t}, y, z_t, z_{t+1}) \right\}$$

The gradient can be approximately calculated using samples and state spaces selected from the set of training data 252. As illustrated above, the gradient consists of two terms. The first term can be calculated directly and the second term is equal to the expectation value. The gradient may be computed using a forward-backward algorithm. The number of hidden states associated with the calculation may be equal to the sequence length, equal to the cardinality of the class labels for the set of closed list attributes, and/or based on a combination of the sequence length and cardinality of the class labels. Regularization of the gradient, for example through the above summation, prevents overfitting of the model.

At step 306, the search direction ($p_k$) is calculated using an updated BFGS equation (based on the prior iteration and/or the initial starting point $x_0$). At step 308, the step length ($\alpha_k$) is calculated such that $\alpha_k$ satisfies the a set of conditions, such as, for example, the Wolfe conditions (i.e., inequalities for performing an inexact line search). The current guess is calculated based on the current guess ($x_k$), the search direction, and the step length, i.e., $x_{k+1}=x_k+\alpha_k p_k$. At step 310, a check is performed to determine if the current iteration (k) exceeds the maximum size of memory (m). If k is less than or equal to m (e.g., the maximum size of memory has not yet been met), the method 300 proceeds directly to step 314. If k is greater than m (e.g., the maximum size of memory has been exceeded), the method proceeds to step 312 and the least recently used memory block is cleared so that the next iteration of the difference ($S_{k+1}$) between the prior point and the next point and the difference between likelihood gradient of this iteration and prior iteration gradient can be stored. After clearing memory, the method proceeds to step 314. At step 314, the difference ($S_{k+1}$) between the prior point and the next point and the difference between likelihood gradient of this iteration and prior iteration gradient are calculated and stored. At step 316, the current iteration index (k) is updated and a condition for convergence or iteration limit of the method 300 is checked. If either of the condition for convergence or the iteration limit is satisfied, the method exits. Otherwise, the method 300 returns to step 304.

With reference back to FIGS. 8 and 9, at step 210, an attribute extraction model 154 configured to identify at least one open list attribute using CRF and at least one closed list attribute using XCRF is output. The attribute extraction model 154 may be provided to a system configured to receive product data and extract attributes, such as the attribute extraction system 26, and/or may be stored in a database for later retrieval, such as the database 32.

Figure 11:
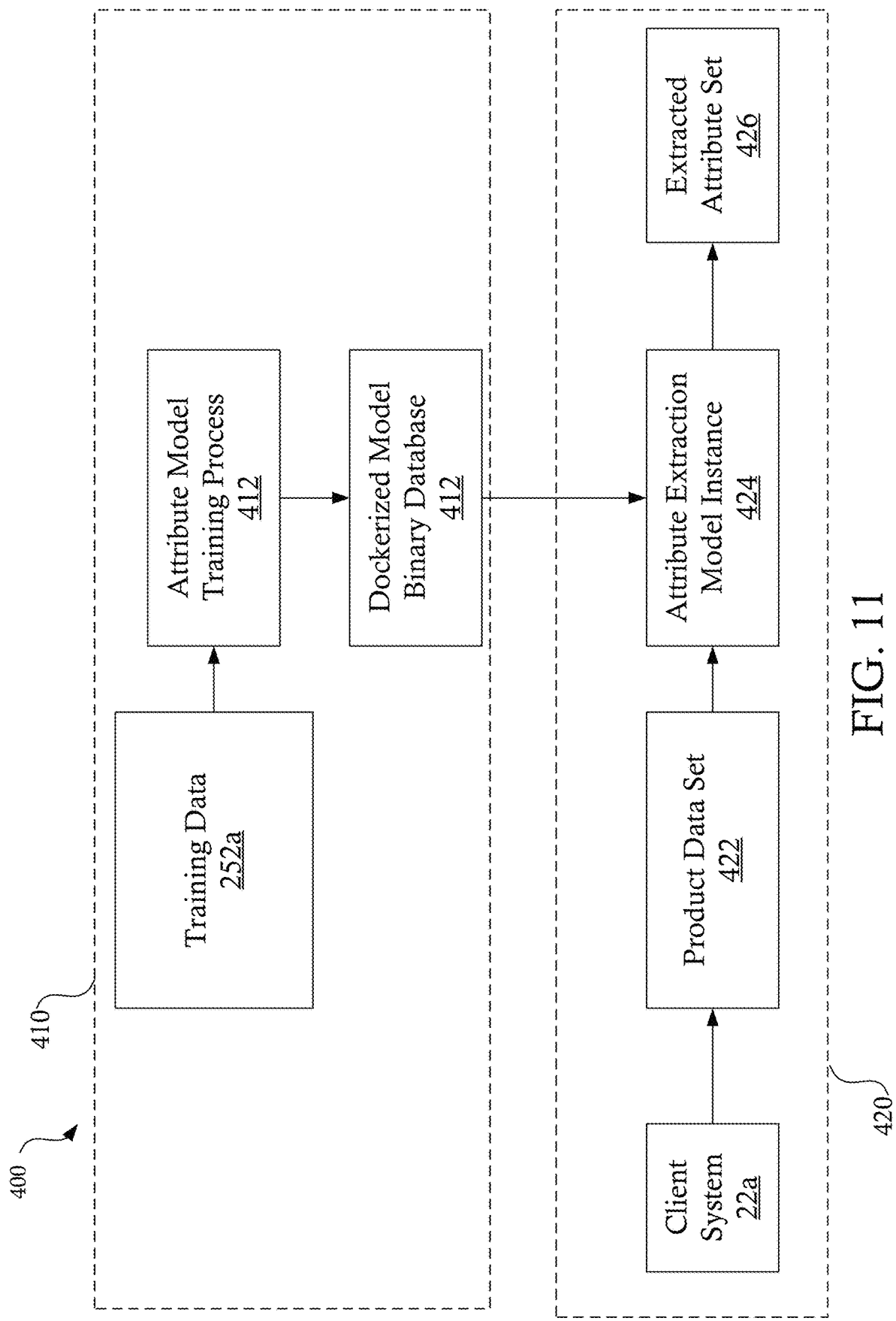
FIG. 11 illustrates a shared training and inferencing process, in accordance with some embodiments.

In some embodiments, attribute extraction models may be generated, hosted, and/or deployed by a shared training and inferencing process 400, as illustrated in FIG. 11. The shared training and inferencing process 400 includes a training process 410 implemented in parallel with an inferencing process 420. During the training process 410, a set of training data 252a is received from a system, such as the frontend system 24. The set of training data includes text-based titles and/or descriptions of a plurality of products and attribute properties consisting of closed list and open list attributes for each of the plurality of products. The training data 252a is provided to an attribute extraction model training process 412. The attribute extraction model training process 412 may implement any suitable training process, such as, for example, the method 200 of training an attribute extraction model 154 discussed above in conjunction with FIGS. 8-10. The attribute extraction model training process 412 generates a trained attribute extraction model, such as attribute extraction model 154, which is stored in a dockerized model binary database 414.

Simultaneously and/or subsequently to the training process 410, the shared training and inferencing process 400 implements an inferencing process 420 configured to extract one or more attributes for one or more products. A set of product data 422 including text-based titles and/or descriptions is received from a system, such as a client system 22a, 22b. The inferencing process 420 retrieves an attribute extraction model, such as attribute extraction model 154, from the dockerized model binary database 414 and implements an instance 424 of the attribute extraction model on a shared inferencing platform, such as a shared server. The attribute extraction instance 424 extracts and outputs the set of attributes 426 extracted from the product data 422.

The disclosed systems and methods reduce costs associated with attribute extraction for product data. For example, the unified attribute extraction model reduces the cost for preparing training data. Non-unified systems require training data to be prepared multiple times as the data must be individually tagged and prepared for each model that is configured (i.e., for each open list attribute model and each closed list attribute model). In contrast, the unified attribute extraction model only requires a single set of prepared training data. Similarly, the computational resources and personnel time (e.g., for preparation of training data) is significantly reduced by training a single unified model as compared to training multiple independent models. The use of a unified attribute extraction model also reduces the number of models that must be deployed, as a single model can extract all relevant attributes from a set of product data. The reduced number of models provides computational savings and reduces the necessary maintenance and overhead for an attribute extraction system.

The disclosed systems and methods provide closed and open list attribute extraction that has high precision and recall. In one example embodiment, an attribute extraction model was trained based on the disclosed system and methods to extract attributes associated with window blinds. Each of the blinds had a text-based title and description associated therewith and included multiple closed list attributes (e.g., lift control, window blinds shade type) and open list attributes (e.g., color and material). The attribute extraction model was trained on a training set and validated using a validation set. The trained model was able to provide attribute extraction of lift control, window blinds shade type, and material with 100% precision. The extraction of lift control and shade type each had a 100% recall and the material had a 99% recall.

In another example embodiment, an attribute extraction model was trained based on the disclosed systems and methods to extract attributes associated with cell phone cases. Each cell phone case had a text-based title and description associate therewith and included multiple closed list attributes (e.g., case type, case features, and compatible devices). The attribute extraction model provided attribute extraction precision and recall above 80% for all closed list attributes.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a memory having instructions stored thereon and a processor configured to read the instructions to:
receive a set of training product data including at least one text-based description and specification of at least one attribute of each product in a set of products, wherein the specification of at least one attribute of each of the products is included in a specified set of attributes including at least one closed list attribute and at least one open list attribute;
train an attribute extraction model including a set of embedding layers used for both closed and open list attribute extractions using the set of training product data, wherein the set of embedding layers are configured to generate a set of embedding features representative of descriptions contained in the set of training product data;
configure the attribute extraction model based on the set of embedding features to generate a sequence label for the at least one open list attribute by implementing a multiple classification conditional random field (CRF) process;
configure the attribute extraction model based on the set of embedding features to generate a class label for the at least one closed list attribute using an extended conditional random field (XCRF) process, wherein the extended CRF process uses a set of hidden variables that are shared with each of the at least one closed list attribute and with each of the open list attribute;
extract at least one output closed list attribute from at least one provided text-based description of each product in a set of products to be identified, wherein the at least one closed list attribute is extracted by the trained attribute extraction model; and
output a set of attributes including each of the at least one output closed list attributes extracted from the at least one text-based description of each of the products in the set of products to be identified.

2. The system of claim 1, wherein the set of hidden variables are representative of one or more states associated with each of the at least one closed list attribute.

3. The system of claim 1, wherein the processor is configured to extract at least one output open list attribute from the at least one provided text-based description of each of the products, wherein the at least one output open list attribute is extracted by the trained attributed extraction model using the CRF process.

4. The system of claim 3, wherein the CRF process is implemented according to:

$$p(y^1, y^2 | x, \lambda_1, \lambda_2) = \left( \sum_z \frac{1}{Z_1} \prod_{t=1}^{T} \Phi_t(x_t, y^1, z_t, z_{t+1}, \lambda_1) \right) \left( \sum_z \frac{1}{Z_2} \prod_{t=1}^{T} \Phi_t(x_t, y^2, z_t, z_{t+1}, \lambda_2) \right)$$

where $y^1$ and $y^2$ are labels associated with open list attributes, Z are variables selected from the set of hidden variables, and $\lambda$ is a weighting of a given parameter.

5. The system of claim 1, wherein the XCRF process is implemented using a limited memory Broyden-Fletcher-Goldfarb-Shanno (L-BFGS) algorithm.

6. The system of claim 5, wherein a likelihood of attribute values is determined according to:

$$\mathcal{L} = \log p(y | x, \lambda) = \log \left( \sum_z \frac{1}{Z_x} \right) + \sum_{t=1}^{T} \log \Phi_t(x_t, y, z_t, z_{t+1}, \lambda)$$

where y is an attribute value, $\lambda$, is a weighting of a given parameter, and Z are variables selected from the set of hidden variables.

7. The system of claim 6, wherein a gradient of the likelihood of attribute values is determined according to:

$$\frac{\delta L}{\delta \lambda_k} = \sum_{n=1}^{N} \left\{ \sum_{t=1}^{T-1} \sum_{z_t=1}^{M} \sum_{z_{t+1}=1}^{M} p(z_t, z_{t+1} | x_{n,t}, y_n, \lambda) f_{i,k}(x_{n,t}, y_n, z_t, z_{t+1}) - \sum_{t=1}^{T-1} \sum_{z_t=1}^{M} \sum_{z_{t+1}=1}^{M} \sum_{y=1}^{|Y|} p(y, z_t, z_{t+1} | x_{n,t}, \lambda) f_{i,k}(x_{n,t}, y, z_t, z_{t+1}) \right\}$$

where y is an attribute value, $\lambda$, is a weighting of a given parameter, and z are the hidden variables.

8. The system of claim 1, wherein the processor is configured to retrieve the trained attribute extraction model from a model database prior to extraction of at least one output closed list attribute.

9. A non-transitory computer readable medium having instructions stored thereon, wherein the instructions, when executed by a processor cause a device to perform operations comprising:
receiving a set of training product data including at least one text-based description and specification of at least one attribute of each of products in a set of products, wherein the specification of at least one attribute of each of the products is included in a specified set of attributes including at least one closed list attribute and at least one open list attribute;

training an attribute extraction model including a set of embedding layers used for both closed and open list attribute extractions by an artificial intelligence network using the set of training product data, wherein the set of embedding layers are configured to generate a set of embedding features representative of descriptions contained in the set of training product data;

configuring the attribute extraction model based on the set of embedding features to generate a sequence label for the at least one open list attribute by implementing a multiple classification conditional random field (CRF) process;

configuring the attribute extraction model based on the set of embedding features to generate a class label for the at least one closed list attribute using an extended conditional random field (XCRF) process, wherein the extended CRF process uses a set of hidden variables that are shared with each of the at least one closed list attribute and with each of the open list attribute;

extracting at least one output closed list attribute from at least one provided text-based description of each of products in a set of products to be identified, wherein the at least one closed list attribute is extracted by the trained attribute extraction model; and outputting a set of attributes including each of the at least one output closed list attributes extracted from the at least one text-based description of each of the products in the set of products to be identified.

10. The non-transitory computer readable medium of claim 9, wherein the set of hidden variables are representative of one or more states associated with each of the at least one closed list attribute.

11. The non-transitory computer readable medium of claim 9, wherein the processor causes the device to perform operations comprising extracting at least one output open list attribute from the at least one provided text-based description of each of the products, wherein the at least one output open list attribute is extracted by the trained attributed extraction model using the CRF process.

12. The non-transitory computer readable medium of claim 11, wherein the CRF process is implemented according to:

$$p(y^1, y^2 | x, \lambda_1, \lambda_2) = \sum_z \frac{1}{Z_1} \prod_{t=1}^{T} \Phi_t(x_t, y^1, z_t, z_{t+1}, \lambda_1)$$

$$\left( \sum_z \frac{1}{Z_2} \prod_{t=1}^{T} \Phi_t(x_t, y^2, z_t, z_{t+1}, \lambda_2) \right)$$

where $y^1$ and $y^2$ are labels associated with open list attributes, Z are variables selected from the set of hidden variables (z), and $\lambda$ is a weighting of a given parameter.

13. The non-transitory computer readable medium of claim 9, where in the XCRF process is implemented using a limited memory Broyden-Fletcher-Goldfarb-Shanno (L-BFGS) algorithm.

14. The non-transitory computer readable medium of claim 13, wherein a likelihood of attribute values is determined according to:

$$\mathcal{L} = \log p(y | x, \lambda) = \log \left( \sum_z \frac{1}{Z_x} \right) + \sum_{t=1}^{T} \log \Phi_t(x_t, y, z_t, z_{t+1}, \lambda)$$

where y is an attribute value, $\lambda$ is a weighting of a given parameter, and Z are variables selected from the set of hidden variables (z).

15. The non-transitory computer readable medium of claim 14, wherein a gradient of the likelihood of attribute values is determined according to:

$$\frac{\delta L}{\delta \lambda_k} = \sum_{n=1}^{N} \left\{ \sum_{t=1}^{T-1} \sum_{z_t=1}^{M} \sum_{z_{t+1}=1}^{M} p(z_t, z_{t+1} | x_{n,t}, y_n, \lambda) f_{i,k}(x_{n,t}, y_n, z_t, z_{t+1}) - \sum_{t=1}^{T-1} \sum_{z_t=1}^{M} \sum_{z_{t+1}=1}^{M} \sum_{y=1}^{|Y|} p(y, z_t, z_{t+1} | x_{n,t}, \lambda) f_{i,k}(x_{n,t}, y, z_t, z_{t+1}) \right\}$$

where y is an attribute value, $\lambda$, is a weighting of a given parameter, and Z are variables selected from the set of hidden variables (z).

16. A method, comprising:

receiving a set of training product data including at least one text-based description and specification of at least one attribute of each of products in a set of products, wherein the specification of at least one attribute of each of the products is included in a specified set of attributes including at least one closed list attribute and at least one open list attribute;

training an attribute extraction model including a set of embedding layers used for both closed and open list attribute extractions by an artificial intelligence network using the set of training product data, wherein the set of embedding layers are configured to generate a set of embedding features representative of descriptions contained in the set of training product data;

configuring the attribute extraction model based on the set of embedding features to generate a sequence label for the at least one open list attribute by implementing a multiple classification conditional random field (CRF) process;

configuring the attribute extraction model based on the set of embedding features to generate a class label for the at least one closed list attribute using an extended conditional random field (XCRF) process, wherein the extended CRF process uses a set of hidden variables that are shared with each of the at least one closed list attribute and with each of the open list attribute;

extracting at least one output closed list attribute from at least one provided text-based description of each of products in a set of products to be identified, wherein the at least one closed list attribute is extracted by the trained attribute extraction model; and outputting a set of attributes including each of the at least one output closed list attributes extracted from the at least one text-based description of each of the products in the set of products to be identified.

17. The method of claim 16, wherein the set of hidden variables are representative of one or more states associated with each of the at least one closed list attribute.

18. The method of claim 16, further comprising extracting at least one output open list attribute from the at least one provided text-based description of each of the products, wherein the at least one output open list attribute is extracted by the trained attributed extraction model using the CRF process.

19. The method of claim 16, wherein a likelihood of attribute values is determined according to:

$$\mathcal{L} = \log p(y \mid x, \lambda) = \log\left(\sum_z \frac{1}{Z_x}\right) + \sum_{t=1}^{T} \log \Phi_t(x_t, y, z_t, z_{t+1}, \lambda)$$

where y is an attribute value, $\lambda$ is a weighting of a given parameter, and Z are variables selected from the set of hidden variables (z).

20. The method of claim 19, wherein a gradient of the likelihood of attribute values is determined according to:

$$\frac{\delta L}{\delta \lambda_k} = \sum_{n=1}^{N} \left\{ \sum_{t=1}^{T-1} \sum_{z_t=1}^{M} \sum_{z_{t+1}=1}^{M} p(z_t, z_{t+1} \mid x_{n,t}, y_n, \lambda) f_{i,k}(x_{n,t}, y_n, z_t, z_{t+1}) - \sum_{t=1}^{T-1} \sum_{z_t=1}^{M} \sum_{z_{t+1}=1}^{M} \sum_{y=1}^{|Y|} p(y, z_t, z_{t+1} \mid x_{n,t}, \lambda) f_{i,k}(x_{n,t}, y, z_t, z_{t+1}) \right\}$$

where y is an attribute value, $\lambda$ is a weighting of a given parameter, and Z are variables selected from the set of hidden variables (z).

\* \* \* \* \*

UNITED STATES PATENT AND TRADEMARK OFFICE
CERTIFICATE OF CORRECTION

PATENT NO.        : 11,645,318 B2
APPLICATION NO.   : 16/998861
DATED             : May 9, 2023
INVENTOR(S)       : Sakib Abdul Mondal et al.

It is certified that error appears in the above-identified patent and that said Letters Patent is hereby corrected as shown below:

In the Claims

Column 14, Claim 7, Lines 45-53 delete:

"
$$\frac{\delta \mathcal{L}}{\delta \lambda_k} = \sum_{n=1}^{N} \left\{ \sum_{t=1}^{T-1} \sum_{z_t=1}^{M} \sum_{z_{t+1}=1}^{M} p(z_t, z_{t+1}|x_{n,t}, y_n, \lambda) f_{i,k}(x_{n,t}, y_n, z_t, z_{t+1}) - \sum_{t=1}^{T-1} \sum_{z_t=1}^{M} \sum_{z_{t+1}=1}^{M} \sum_{y=1}^{|Y|} p(y, z_t, z_{t+1}|x_{n,t}, \lambda) f_{i,k}(x_{n,t}, y, z_t, z_{t+1}) \right\}$$
"

And insert:

--
$$\frac{\delta \mathcal{L}}{\delta \lambda_k} = \sum_{n=1}^{N} \left\{ \sum_{t=1}^{T-1} \sum_{z_t=1}^{M} \sum_{z_{t+1}=1}^{M} p(z_t, z_{t+1}|x_{n,t}, y_n, \lambda)\, f_{i,k}(x_{n,t}, y_n, z_t, z_{t+1}) - \sum_{t=1}^{T-1} \sum_{z_t=1}^{M} \sum_{z_{t+1}=1}^{M} \sum_{y=1}^{|Y|} p(y, z_t, z_{t+1}|x_{n,t}, \lambda)\, f_{i,k}(x_{n,t}, y, z_t, z_{t+1}) \right\}$$
--

Column 16, Claim 15, Lines 15-21 delete:

"
$$\frac{\delta \mathcal{L}}{\delta \lambda_k} = \sum_{n=1}^{N} \left\{ \sum_{t=1}^{T-1} \sum_{z_t=1}^{M} \sum_{z_{t+1}=1}^{M} p(z_t, z_{t+1}|x_{n,t}, y_n, \lambda)\, f_{i,k}(x_{n,t}, y_n, z_t, z_{t+1}) - \sum_{t=1}^{T-1} \sum_{z_t=1}^{M} \sum_{z_{t+1}=1}^{M} \sum_{y=1}^{|Y|} p(y, z_t, z_{t+1}|x_{n,t}, \lambda)\, f_{i,k}(x_{n,t}, y, z_t, z_{t+1}) \right\}$$
"

Signed and Sealed this
Fifth Day of March, 2024

*Katherine Kelly Vidal*
*Director of the United States Patent and Trademark Office*

And insert:

$$\frac{\delta \mathcal{L}}{\delta \lambda_k} = \sum_{n=1}^{N} \left\{ \sum_{t=1}^{T-1} \sum_{z_t=1}^{M} \sum_{z_{t+1}=1}^{M} p(z_t, z_{t+1} | x_{n,t}, y_n, \lambda) f_{i,k}(x_{n,t}, y_n, z_t, z_{t+1}) - \sum_{t=1}^{T-1} \sum_{z_t=1}^{M} \sum_{z_{t+1}=1}^{M} \sum_{y=1}^{|Y|} p(y, z_t, z_{t+1} | x_{n,t}, \lambda) f_{i,k}(x_{n,t}, y, z_t, z_{t+1}) \right\}$$

--   --

Column 17, Claim 20, Lines 20-25 delete:

"$$\frac{\delta \mathcal{L}}{\delta \lambda_k} = \sum_{n=1}^{N} \left\{ \sum_{t=1}^{T-1} \sum_{z_t=1}^{M} \sum_{z_{t+1}=1}^{M} p(z_t, z_{t+1} | x_{n,t}, y_n, \lambda) f_{i,k}(x_{n,t}, y_n, z_t, z_{t+1}) - \sum_{t=1}^{T-1} \sum_{z_t=1}^{M} \sum_{z_{t+1}=1}^{M} \sum_{y=1}^{|Y|} p(y, z_t, z_{t+1} | x_{n,t}, \lambda) f_{i,k}(x_{n,t}, y, z_t, z_{t+1}) \right\}$$,"

And insert:

$$\frac{\delta \mathcal{L}}{\delta \lambda_k} = \sum_{n=1}^{N} \left\{ \sum_{t=1}^{T-1} \sum_{z_t=1}^{M} \sum_{z_{t+1}=1}^{M} p(z_t, z_{t+1} | x_{n,t}, y_n, \lambda) \, f_{i,k}(x_{n,t}, y_n, z_t, z_{t+1}) - \sum_{t=1}^{T-1} \sum_{z_t=1}^{M} \sum_{z_{t+1}=1}^{M} \sum_{y=1}^{|Y|} p(y, z_t, z_{t+1} | x_{n,t}, \lambda) \, f_{i,k}(x_{n,t}, y, z_t, z_{t+1}) \right\}$$

--   --